United States Patent
Hosoya et al.

(10) Patent No.: US 6,347,844 B1
(45) Date of Patent: Feb. 19, 2002

(54) SOLENOID VALVE DEVICE

(75) Inventors: Yukio Hosoya; Shintaro Kawaishi; Takashi Fujii, all of Hamakita (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/556,393

(22) Filed: Apr. 24, 2000

(30) Foreign Application Priority Data

Apr. 26, 1999 (JP) ............................................. 11-118264

(51) Int. Cl.⁷ .................................................. B60T 8/36
(52) U.S. Cl. ...................................... 303/119.2; 303/900
(58) Field of Search ........................... 303/119.1, 119.2, 303/900, 901

(56) References Cited

U.S. PATENT DOCUMENTS

| | | | | |
|---|---|---|---|---|
| 5,167,442 A | * | 12/1992 | Alaze et al. ............. | 303/113.2 |
| 5,388,899 A | * | 2/1995 | Volz et al. ............... | 303/119.2 |
| 5,443,309 A | * | 8/1995 | Beck ....................... | 303/119.2 |
| 5,603,483 A | * | 2/1997 | Reuter et al. .......... | 251/129.02 |
| 5,618,086 A | * | 4/1997 | Reuter .................... | 303/119.2 |
| 5,647,644 A | * | 7/1997 | Volz et al. ............... | 303/119.2 |
| 5,791,628 A | * | 8/1998 | Wolff et al. .................... | 251/52 |
| 5,803,556 A | * | 9/1998 | Weis et al. ............... | 303/119.2 |
| 5,836,334 A | * | 11/1998 | Mittwollen et al. ............ | 137/1 |
| 5,879,060 A | * | 3/1999 | Megerle et al. .......... | 303/119.2 |
| 5,887,956 A | * | 3/1999 | Rausch .................... | 303/119.2 |
| 5,967,627 A | * | 10/1999 | Hosoya et al. .......... | 303/119.2 |
| 5,971,501 A | * | 10/1999 | Hosoya et al. ........... | 303/119.2 |
| 5,984,261 A | * | 11/1999 | Akita .......................... | 251/127 |
| 6,019,441 A | * | 2/2000 | Lloyd et al. ................ | 303/156 |
| 6,022,086 A | * | 2/2000 | Braum ..................... | 303/119.2 |
| 6,065,734 A | * | 5/2000 | Tackett et al. ......... | 251/129.02 |
| 6,086,164 A | * | 7/2000 | Ochler et al. ............ | 303/119.2 |

* cited by examiner

Primary Examiner—Robert J. Oberleitner
Assistant Examiner—Xuan Lan Nguyen
(74) Attorney, Agent, or Firm—Arent Fox Kintner Plotkin & Kahn, PLLC

(57) ABSTRACT

A solenoid valve device which reduces noise and still conducts opening and closing operation. The solenoid valve device, installed in a brake fluid channel between a master cylinder and a wheel cylinder, includes a master cylinder port connected to a channel located at the master cylinder side, a wheel cylinder port connected to a channel located at the wheel cylinder side, a hydraulic chamber connected to a high resistance duct and the master cylinder port, a switching valve activated due to a hydraulic pressure difference between the hydraulic chamber and the wheel cylinder port to form an orifice; and a solenoid valve, installed in a channel connecting a switching valve and the wheel cylinder port, which opens or closes the channel by application of an electromagnetic force.

4 Claims, 3 Drawing Sheets

SOLENOID VALVE DEVICE

BACKGROUND OF THE INVENTION

This invention relates to a solenoid valve device especially suitable for a brake hydraulic control system for a motor vehicle.

A traditional attempt is made in order to reduce a commonly known noise created in a brake fluid channel in brake hydraulic control system during braking of a vehicle. In that attempt, a solenoid valve is configured with a switching valve which can be opened or closed by differential pressure between before and after the solenoid valve. The occurrence of a differential pressure closes the switching valve thereby activating an orifice channel when releasing the solenoid valve.

In that type of solenoid valve, since an orifice channel is located closer to a wheel cylinder side than the solenoid valve is flow velocity through the solenoid valve, which has a channel area wider than the orifice channel, is higher than flow velocity through the orifice channel. Accordingly, higher hydraulic pressure at the master cylinder side of the solenoid valve delays the closing of the solenoid valve or prevents the sufficient closing of the solenoid valve.

OBJECT AND SUMMARY OF THE INVENTION

An object of this invention is to provide a solenoid valve device which makes the reduction of the above-mentioned noise and its normal opening and closing operation possible.

A further object of this invention is to provide a solenoid valve device which makes an accurate switching valve operation possible.

In the first aspect of the invention, a solenoid valve device, installed in a brake fluid channel between a master cylinder and a wheel cylinder, comprises a master cylinder port connected to a channel located at the master cylinder side, a wheel cylinder port connected to a channel located at the wheel cylinder side, a hydraulic chamber connected to a high-resistance duct and the master cylinder port, a switching valve activated due to a hydraulic pressure difference between the hydraulic chamber and the wheel cylinder port to form an orifice; and a solenoid valve, installed in a channel connecting a switching valve and the wheel cylinder port, which opens or closes the channel by application of an electromagnetic force.

In the second aspect of this invention, a solenoid valve device as above further comprises a piston which is capable of stroking due to hydraulic pressure of the hydraulic chamber and the wheel cylinder port and a piston spring urging the piston toward the hydraulic chamber side; wherein an orifice is formed upon an upward piston stroke sliding away from the hydraulic chamber side to operate the switching valve.

In the third aspect of the invention, a solenoid valve device as above further comprises a nozzle extending into the piston and a hydraulic supply opening connected to the hydraulic chamber between the nozzle and the piston.

In the fourth aspect of the invention, a solenoid valve device as above further comprises a valve housing inside which the piston is housed to form the hydraulic chamber with the piston and a hydraulic supply duct which is formed between the valve housing and the piston and connects the hydraulic chamber and the hydraulic supply opening.

In the fifth aspect of the invention, a solenoid valve device as above further comprises a relief channel bypassing the solenoid valve and the switching valve.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF PREFERRED EMBODIMENTS

An embodiment of this invention is explained with reference to the drawings below.

Figure 1:
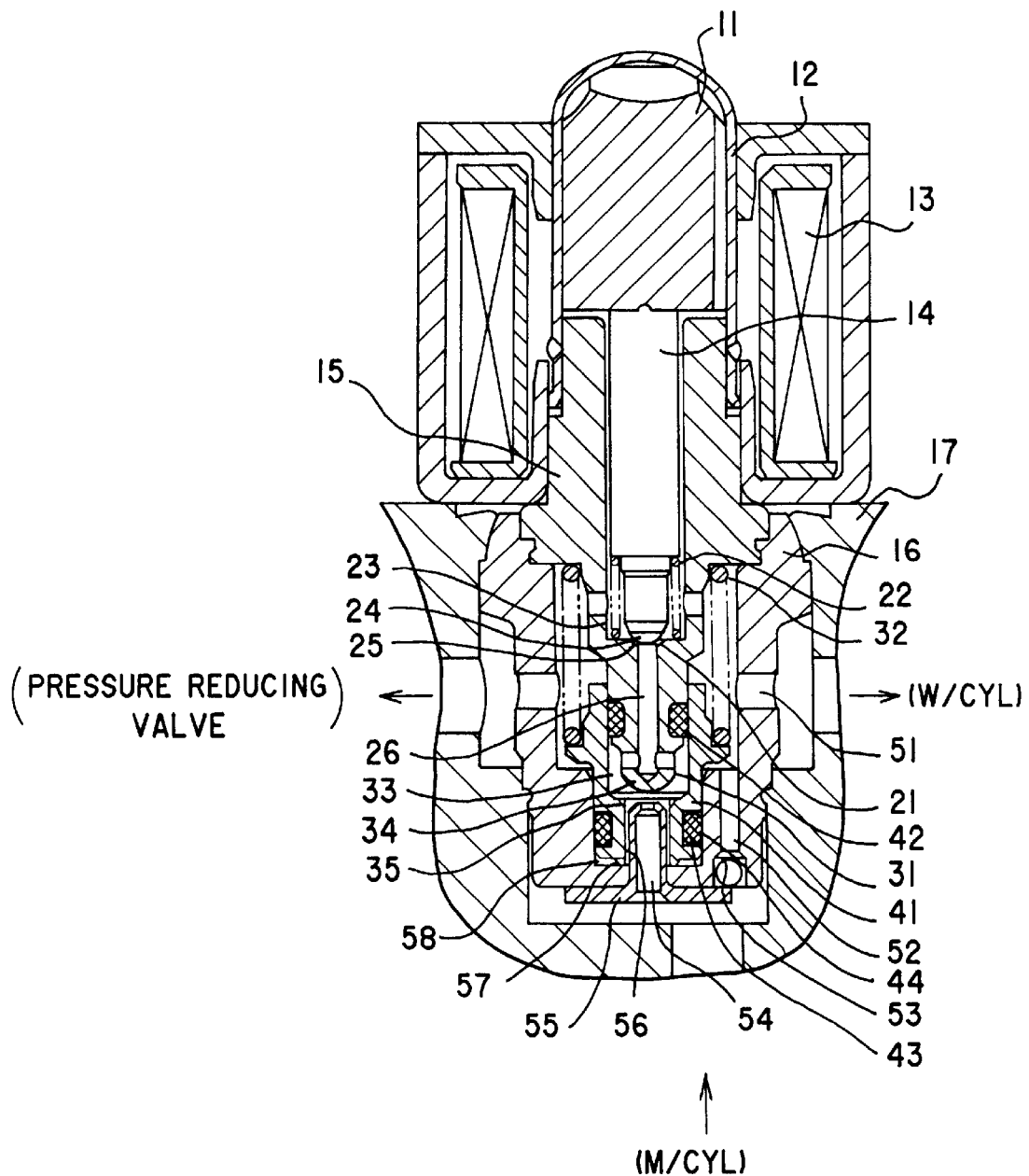
FIG. 1 is a cross-section view of the solenoid valve.
Figure 2:
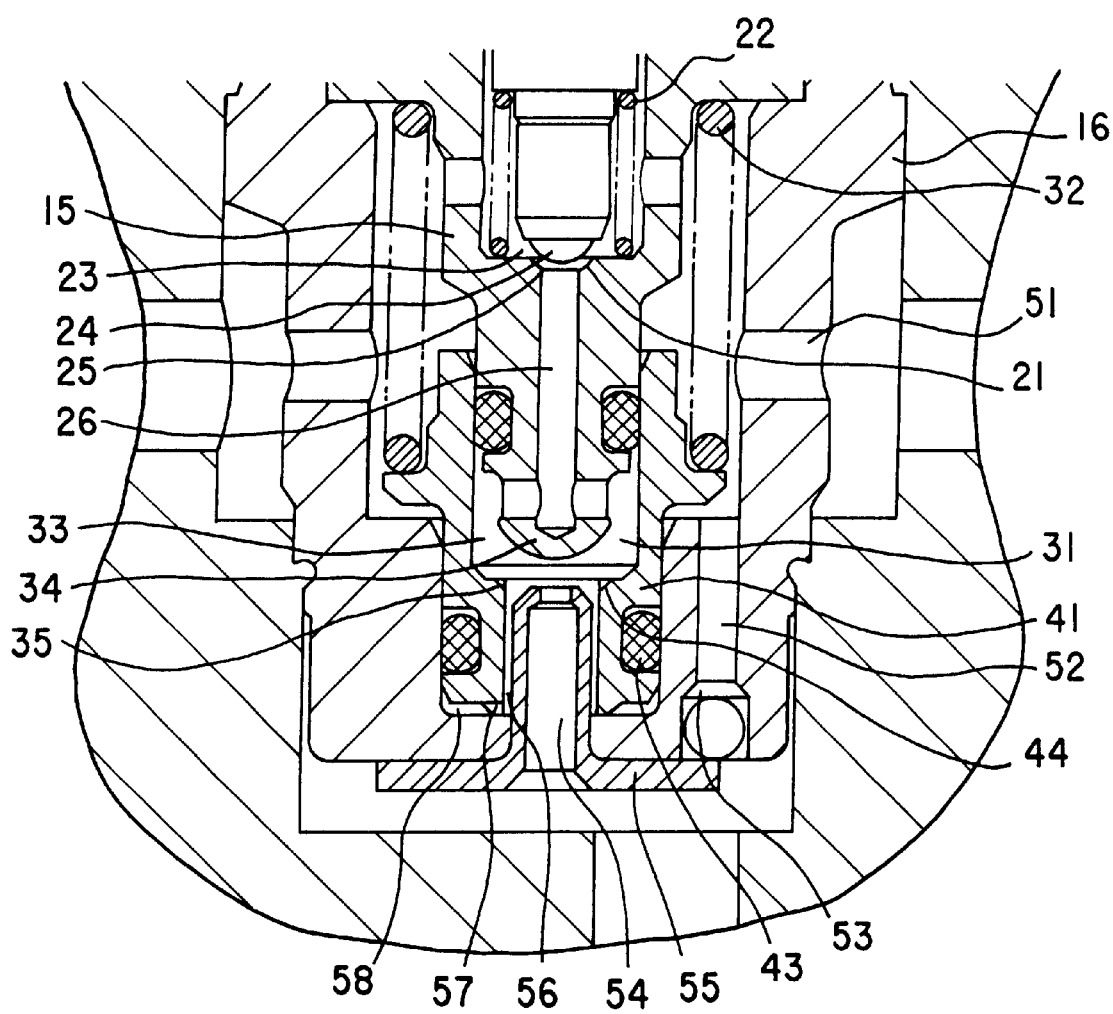
FIG. 2 is an enlarged view of the section showing the valve of the solenoid valve.

A solenoid valve device is generally designed to electromagnetically control opening and closing operation of a brake fluid channel. FIG. 1 is a cross-section view which illustrates an example of a normally opened solenoid valve device. FIG. 2 is an enlarged view of that valve structure of the example in the FIG. 1.

The solenoid valve device of this invention comprises a wheel cylinder port 51 which is connected to a brake fluid channel at the wheel cylinder side, a master cylinder port 54 which is connected to a brake fluid channel at the master cylinder side, a solenoid valve 21 which electromagnetically opens or closes and is installed between the wheel cylinder port 51 and the wheel cylinder port 54, and a switching valve 31 which opens or closes due to differential pressure (hydraulic pressure difference between before and after the solenoid valve). The solenoid valve device further comprises a solenoid coil 13 coiled around a sleeve 12, an armature 11 slidably housed in the sleeve 12, a solenoid stem 14 contacts with the armature 11 at each end urged by a valve spring 22, a first valve housing 15 and a second valve housing 16 surrounding the solenoid valve 21 and the switching valve 31, respectively, and an aluminum block 17 located outside the first and second valve housings 15, 16.

The solenoid valve 21 is a valve which electromagnetically activated for opening and closing valve operation. The solenoid valve 21 comprises a first valve chamber 23 formed inside the first valve housing 15, a first valve element 24 located at the end of the stem 14, a valve spring 22 urging the solenoid valve to be normally open, and a first valve seat 25 housed in the first valve housing 15. The first valve chamber 23 is connected to output channels, one at the wheel cylinder port 51 and one at a pressure reducing valve side. In addition, the first valve chamber 23 is connected to a second valve chamber 33 of the switching valve 31 via the first valve element 24, the first valve seat 25, and an intervalve channel 26 formed in the first valve housing 15.

The switching valve 31 is a valve which is activated for opening and closing valve operation by differential pressure (hydraulic pressure difference between before and after the solenoid valve). The switching valve 31 comprises the second valve chamber 33 formed inside the second valve housing 16, a second valve element 34 formed at the end of the first valve housing 15, a piston 41 arranged between the first and second valve housings 15 and 16, a second valve seat 35 formed in the piston 41, and a piston spring 32 urging the piston 41 in a direction away from the first valve housing 15. The second valve chamber 33 is connected to the master cylinder port 54 via the piston 41 and a nozzle 55 housed in the second valve housing 16.

The piston 41 is arranged to be capable of stroking relative to the first and second valve housings 15, 16. The piston 41 is arranged to be capable of stroking via the first valve housing 15 and a first O-ring 42 or via the second valve housing 16 and a second O-ring 43. The piston spring 32 urges the piston 41 so that the switching valve 31 is normally open.

Depending upon the amount of resultant force from adding a force of hydraulic pressure of a hydraulic chamber 57, a force of hydraulic pressure of the wheel cylinder port 51, and a spring force of the piston spring 32, the piston 41 strokes relative to the first and second valve housings 15 and 16, thereby operating the switching valve 31.

The nozzle 55 is so designed to form a channel at the master cylinder port 54 and to extend into the piston 41. The nozzle 55 is fixed to the second valve housing 16.

A hydraulic chamber 58 is provided as a space which is connected to the master cylinder port 54 and a high-resistance channel. This hydraulic chamber 58 is formed between the piston 41 and the second valve housing 16. A hydraulic supply opening 56 is provided as an inlet through which hydraulic pressure is supplied into the hydraulic chamber 58.

A hydraulic supply duct 57 is provided as a channel which makes a connection between the hydraulic supply opening 56 and the hydraulic chamber 58. The hydraulic supply duct 57 is formed between the second valve housing 16 and the piston 41. The channel connecting the hydraulic supply opening 56 and the hydraulic chamber 58 is designed to be a high-resistance one due to the hydraulic supply duct 57.

An orifice is provided as a channel which is formed by a notched groove 44 during the process when the piston 41 strokes or moves due to the hydraulic pressure difference between the hydraulic chamber 58 and the wheel cylinder port 51 and the second valve seat 35 on which the second valve element 34 sits.

A relief channel 52 is provided for releasing brake fluid to the master cylinder port 54 when hydraulic pressure at the master cylinder port 54 is released. The relief channel 52 is formed in the second valve housing 16. The relief channel 52 is a channel which connects the wheel cylinder port 51 and the master cylinder port 54 via a check valve 53 and bypasses the solenoid valve 21 and the switching valve 31.

Solenoid valve device operation of this invention is explained below.

In a condition that no electric current flows in the solenoid coil 13, the first valve element 24 lifts from the first valve seat 25 due to the spring force of the valve spring 22. In this manner, the solenoid valve 21 is opened. In that condition, the first valve chamber 23 of the solenoid valve 21 is open to the second valve chamber 33 of the switching valve 31. Hydraulic pressure in the wheel cylinder port 51 is added to the second valve chamber 33 via the first valve chamber 23.

In a condition that electric current flows in the solenoid coil 13, the armature 11 and stem 14 are urged, against the spring force of the valve spring 22, to cause the first valve element 24 to abut against the first valve seat 25. In this manner, the solenoid valve 21 is closed. In that condition, communication between the first valve chamber 23 of the solenoid valve 21 and the second valve chamber 33 of the switching valve 31 is shut off.

When brake fluid passes through the hydraulic supply opening 56 and the hydraulic supply duct 57 causing the hydraulic pressure in the hydraulic chamber 58 to increase, and when the force applied to the piston 41 by the hydraulic pressure in the hydraulic chamber 58 becomes larger than a resultant force of the force applied to the piston 41 by the piston spring 32 and the force applied to the piston 41 by the hydraulic pressure of the wheel cylinder port 51, the piston 41 strokes against the urging of the piston spring which closes the switching valve 31 and forms an orifice. On the other hand, when the resultant force becomes smaller than the hydraulic pressure in the hydraulic chamber 58, the piston 41 strokes and opens the switching valve 31.

In the hydraulic chamber 58, a channel, which has a high-resistance against brake fluid flow, is formed between it and the master cylinder port 54. For instance, this high-resistance channel is composed of the hydraulic supporting opening 56 and the hydraulic support duct 57 formed between the second valve housing 16 and the nozzle 55.

This high-resistance channel prevents rapid hydraulic pressure increase in the hydraulic chamber 58 and does not quickly close the switching valve even if the hydraulic pressure in the master cylinder port 54 rapidly increases.

Since in normal braking operation, the solenoid valve 21 and the switching valves 31 are open, brake fluid (hydraulic flow to be transmitted) flowing into the device from the master cylinder port 54 passes through the channel of the nozzle 55, is lead to the switching valve 31, passes through the solenoid valve 21, reaches the wheel cylinder port 51, and ultimately passes (is communicated) to the wheel cylinder.

During anti-lock braking control, if a wheel speed sensor and an electronic control unit (ECU) (not shown in the diagram) judge that hydraulic pressure in the wheel cylinder (not shown in the diagram) is excessive, the solenoid valve 21 is closed in order to stop supplying hydraulic pressure to the wheel cylinder port 51. Also, almost simultaneously, a pressure reducing valve (not shown in the diagram) is opened, releasing the excessive fluid in the wheel cylinder port 51, and reducing the hydraulic pressure. Accordingly, there exists a differential pressure between the master cylinder port 54 and wheel cylinder port 51 of the solenoid valve 21.

Under this condition, if operational force of the hydraulic pressure of the hydraulic chamber 58 becomes larger due to a resultant force of the operation force of the piston spring 32 and that of hydraulic pressure of the wheel cylinder port 51 relative to the piston 41, the piston 41 strokes to close the switching valve 31.

At this time, the notched groove 44 is formed on the piston 41 and the orifice is formed on the switching valve 31.

Next, if the wheel cylinder port 51 requires a pressure increase and the solenoid valve 21 is opened, the notched groove 44 formed on the switching valve 31 functions and controls a fluid energy more than required, thereby reducing noise.

Figure 3:
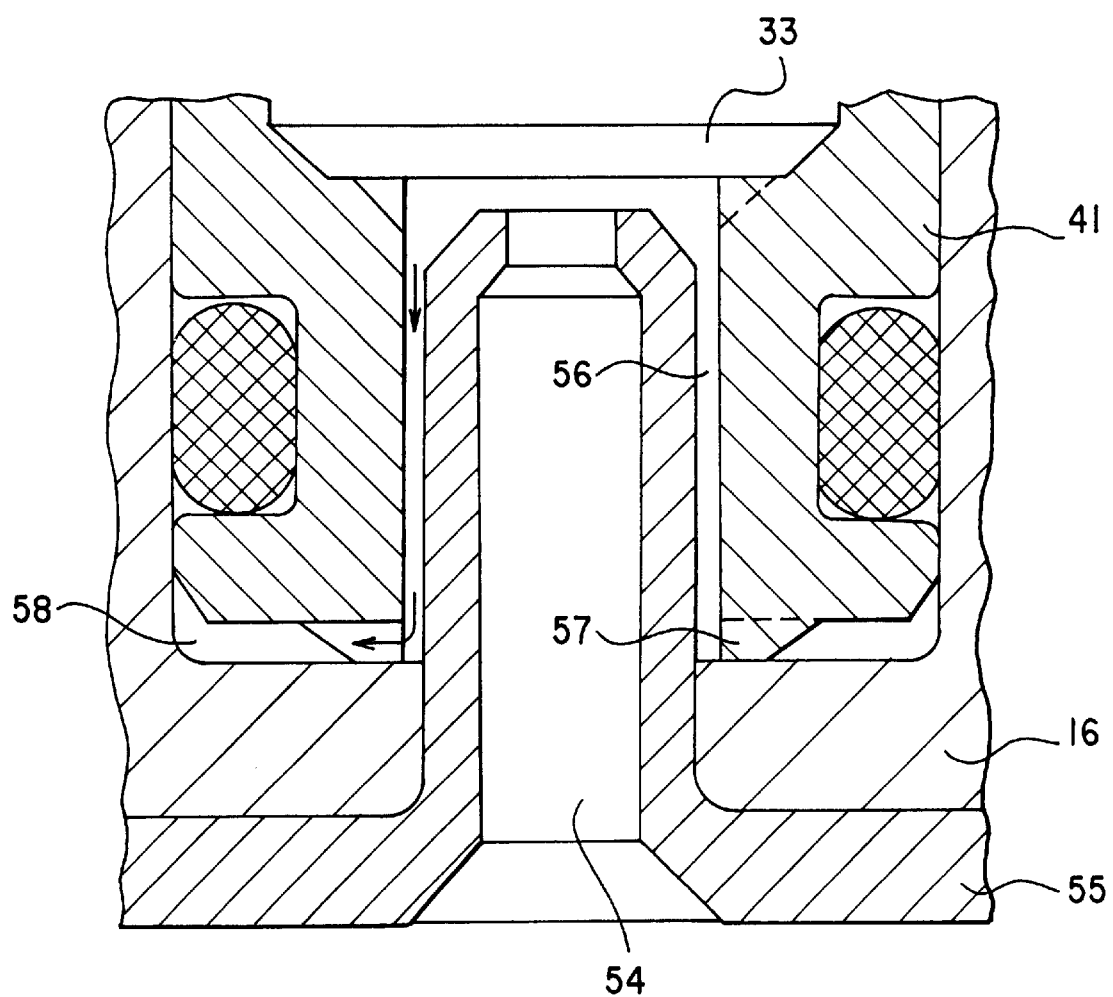
FIG. 3 is an enlarged view of the section showing the hydraulic supply channel.

The channel flowing through the notched groove 44 and the hydraulic supply channel (hydraulic supply opening and hydraulic supply duct 57) to activate the piston 41, are separated even in a quick brake application see FIG. 3. Further, the hydraulic pressure at a quick brake application is designed to rarely directly affect the hydraulic chamber 58. Accordingly, the above-structure prevents malfunction of the solenoid valve device, and a sufficient relief channel (orifice channel) is secured without an additional orifice in the master cylinder port.

Upon termination of the anti-lock brake operation, if hydraulic pressure in the master cylinder port 54 is reduced, the piston 41 strokes due to the spring force of the piston spring 32 and the switching valve 31 is opened. At the same time, brake fluid remaining in the wheel cylinder port 51 returns to a channel at the master cylinder side via the solenoid valve 21 opened by the valve spring 22, the relief channel 52, and the check valve 53.

This invention has advantages in that a solenoid valve of this invention reduces the above-mentioned noise and conducts accurate opening and closing operation; and a solenoid valve of this invention appropriately controls switching valve operation.

It is readily apparent that the above-described has the advantage of wide commercial utility. It may be understood that the specific form of the invention hereinabove described is intended to be representative only, as certain modifications within the scope of these teachings will be apparent to those skilled in the art. Accordingly, reference should be made to the following claims in determining the full scope of the invention.

What we claim is:

1. A solenoid valve device, installed in a brake fluid channel between a master cylinder and a wheel cylinder, which comprises:
    a master cylinder port connected to a channel located at said master cylinder side;
    a wheel cylinder port connected to a channel located at said wheel cylinder side;
    a piston disposed between the wheel cylinder side and the master cylinder side and having a groove therein;
    a hydraulic supply opening connected to a hydraulic chamber at said master cylinder side; said hydraulic chamber connected to a high-resistance duct and said master cylinder port, wherein said high-resistance duct connects said hydraulic supply opening to said hydraulic chamber forming a hydraulic supply channel; and wherein a channel flowing through said groove is separated from said hydraulic supply channel;
    a switching valve activated due to a hydraulic pressure difference between said hydraulic chamber and said wheel cylinder port to form an orifice;
    a solenoid valve, installed in a channel connecting said switching valve and said wheel cylinder port, which opens or closes said channel by application of an electromagnetic force; and
    a nozzle extending into said piston wherein said hydraulic supply opening is disposed along a side of the piston.

2. A solenoid valve device as claimed in claim 1, which further comprises:
    a piston which is capable of stroking due to hydraulic pressure of said hydraulic chamber and said wheel cylinder port and;
    a piston spring urging said piston toward said hydraulic chamber side;
    wherein:
        an orifice is formed upon an upward piston stroke sliding away from said hydraulic chamber side to operate said switching valve.

3. A solenoid valve device as claimed in claim 2, which further comprises:
    a valve housing inside which said piston is housed to form said hydraulic chamber with said piston, and
    a hydraulic supply duct which is formed between said valve housing and said piston and connects said hydraulic chamber and said hydraulic supply opening.

4. A solenoid valve device as claimed in claim 1, which further comprises:
    a relief channel bypassing said solenoid valve and said switching valve.

* * * * *